United States Patent [19]

Jordan

[11] 4,069,794

[45] Jan. 24, 1978

[54] POSITIVE POWER CONTROL INTERNAL COMBUSTION ENGINE

[76] Inventor: Robert Denney Jordan, 9020 Barcelona St., NRMC, Oakland, Calif. 94605

[21] Appl. No.: 713,161

[22] Filed: Aug. 10, 1976

[51] Int. Cl.$^2$ .................... F02B 19/16; F02D 19/00; F02F 3/26; F02B 33/34
[52] U.S. Cl. .................... 123/25 A; 123/32 ST; 123/119 C; 123/193 P; 123/193 CP; 123/59 BS; 123/65 VB
[58] Field of Search ........... 123/32 ST, 32 SP, 193 P, 123/193 CP, 25 R, 25 A, 119 C, 119 D, 124 R, 65 S, 59 BS, 65 VB

[56] References Cited

U.S. PATENT DOCUMENTS

| | | | |
|---|---|---|---|
| 406,160 | 7/1889 | Capitaine | 123/25 A |
| 1,103,488 | 7/1914 | Cochran | 123/59 BS |
| 1,578,228 | 3/1926 | Yearsley | 123/65 VB |
| 1,676,512 | 7/1928 | Allen | 123/59 BS |
| 1,789,190 | 1/1931 | Noble | 123/65 VB |
| 1,849,372 | 3/1932 | Hammond et al. | 123/65 S |
| 2,224,229 | 12/1940 | Miller | 123/65VB |
| 2,254,438 | 9/1941 | McCarthy | 123/32 SP |
| 2,376,968 | 5/1945 | Jones | 123/59 BS |
| 3,749,066 | 7/1973 | Cseh | 123/65 S |

*Primary Examiner*—Charles J. Myhre
*Assistant Examiner*—Ira S. Lazarus

*Attorney, Agent, or Firm*—Richard S. Sciascia; Paul N. Critchlow

[57] ABSTRACT

The two-stroke engine has a piston mounted in a cylinder having a full diameter bore throughout its major length and a reduced diameter upper bore portion. The piston has the same configuration and in its upward compression stroke, air and finely-divided water droplets are admitted into an annular space formed between the piston's reduced diameter and the cylinder's full diameter. Flow of the air water mixture through an exhaust valve cools the motor. At TDC (top dead center) the upper surfaces of the piston and the cylinder mutually form a relatively small spheroidal combustion chamber. Differing compression ratios in the annular and the spheroidal chamber cause the air-water mixture to rush into the spheroid in a swirling motion to intimately mix with injected fuel. Ignition produces a complete burning. End gases or the like are burnt in the cooler annular space to avoid detonation. The fuel injection is in measured increments determined by the temperature and pressure of the water mixture. The water supply also is metered responsively both to the engine temperature and the fuel demands. To increase engine output, an operator varies the amount and pressure of the air supply by varying the eccentricity of an eccentric vane blower. A special high pressure injection system is provided for improving both safety and performance.

16 Claims, 12 Drawing Figures

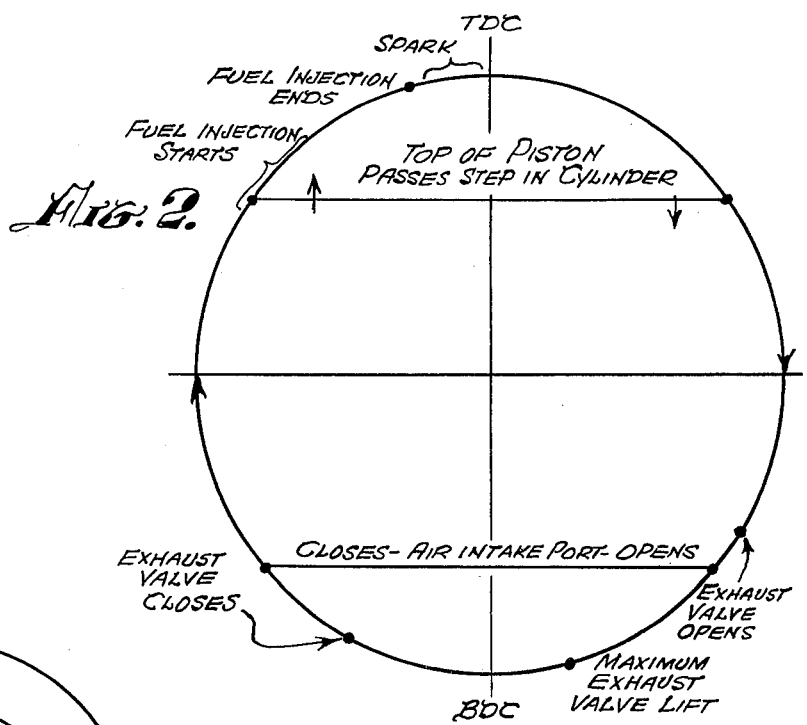
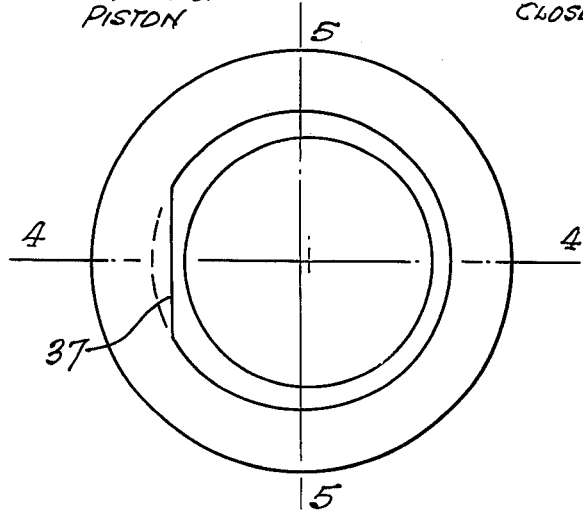
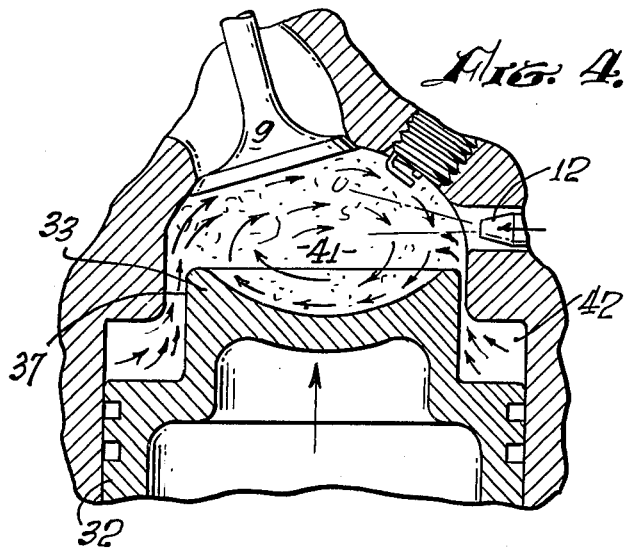
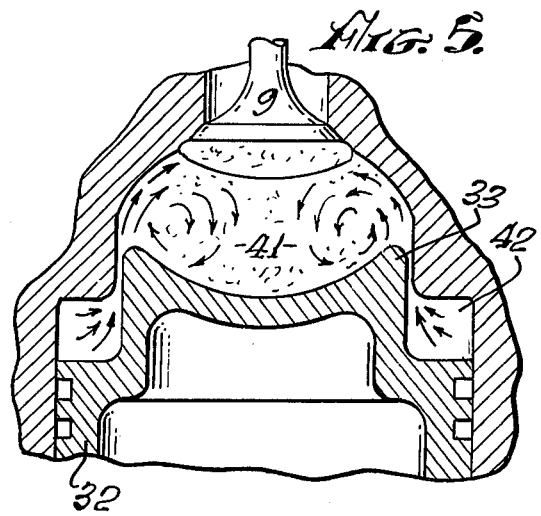

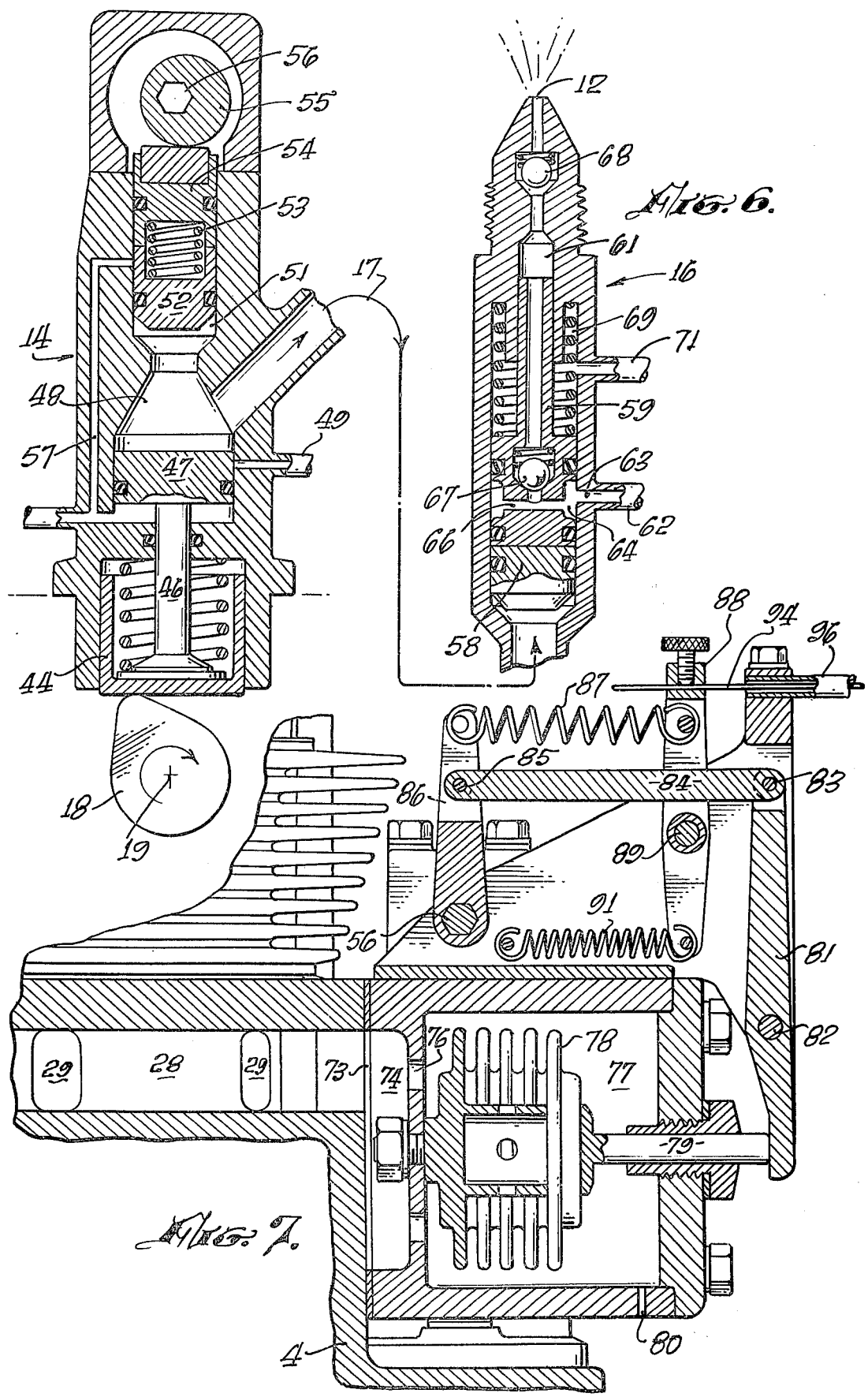

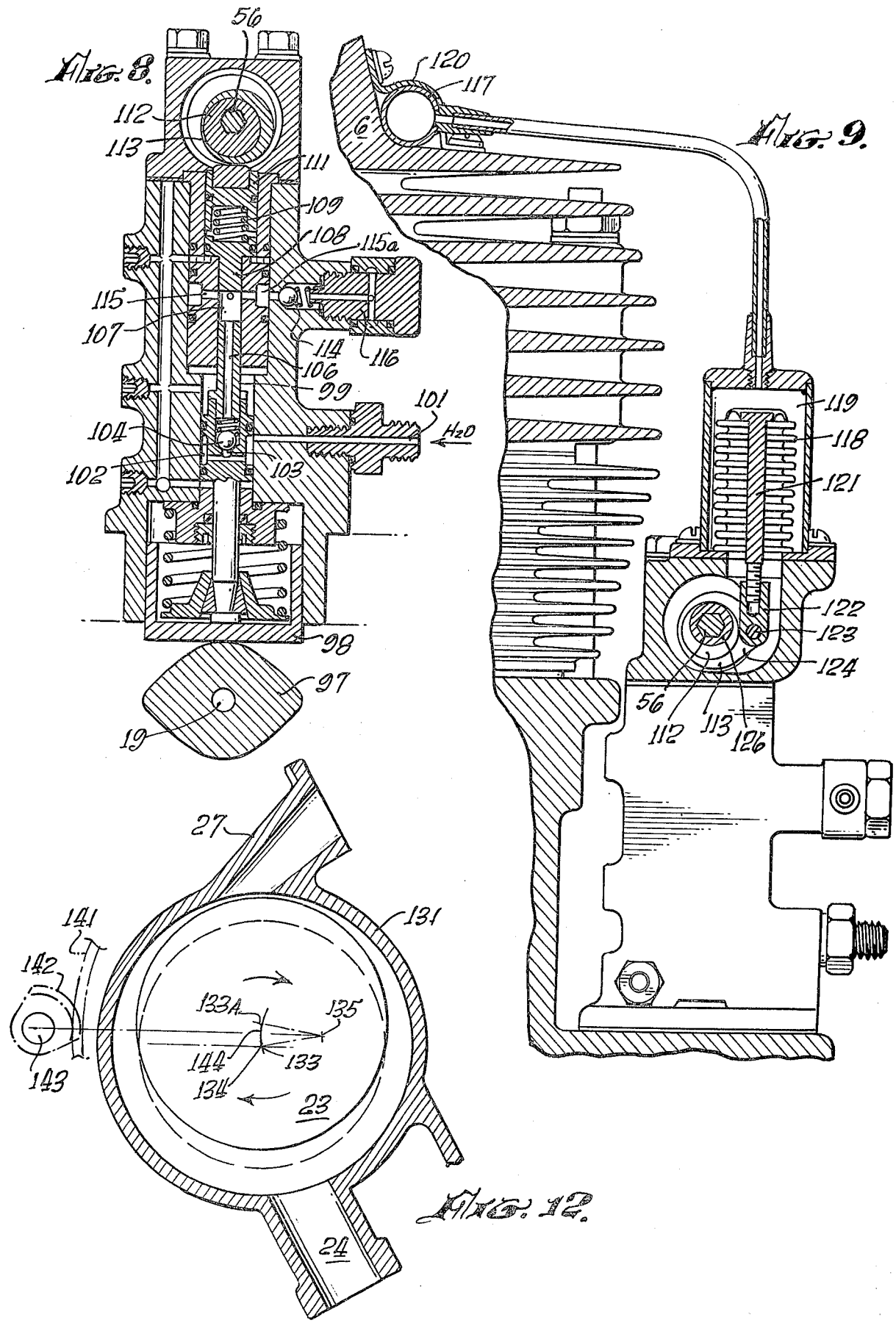

POSITIVE POWER CONTROL INTERNAL COMBUSTION ENGINE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to internal combustion engines and, particularly, to higher efficiency, clean gasoline engines adapted for use in automobiles, aircraft, boats, etc.

Internal combustion engines which burn air-gas mixtures are, of course, on common use and obviously require little description. Customarily, four-stroke engines are used, the strokes being the familiar intake, compression, power and exhaust. Combustion occurs near the end of the compression stroke. Specially-designed carburetors mix the fuel with the air. Ignition normally is accomplished by a spark. The power output of the engine is operator-controlled, usually be means of a throttling action or, in other words, a restriction of the flow of air to the engine. Power is taken off the reciprocating pistons by a crank shaft and the net power produced by the engine taken off the end of the crank shaft. Cooling normally is achieved by circulating water which requires the conventional water pumps, radiator, fan hose, etc. Gasoline obviously is the preferred fuel because of its large number of retail outlets, as well as the fact that it is reasonably safe compared with liquified gases and not as messy as diesel fuel.

However, engines in present use have some well-recognized limitations and disadvantages. For example, fuel economy or, in other words, the useful energy produced per unit mass of fuel, is poor both in an absolute and a relative sense. Only a small fraction of the energy in the gasoline fuel is converted into useful work and, in fact, diesel engines are much more efficient, although they do have other characteristics which have limited their popularity. Another ever-increasing problem is that the common gasoline engine produces excessive levels of pollutants consisting of unburned fuel and of various combustion products. Most of these deficiencies are the result of one or more characteristics of this type of engine. To a considerable extent, the deficiencies are due to inadequate control of the air-fuel mix, as well as the fact that power output is controlled by throttling. Further, due to detonation problems, there are definite limitations on compression ratios and hence, the efficiency of the engines.

As to the adequate control of the air-fuel mixture, it is known that a great deal of energy is wasted because a significant fraction of the gasoline does not burn during the combustion process. This unburnt fuel is exhausted and it contributes heavily to pollution. The problem is caused by poor ratio control by the carburetor and poor mixing of the air and the fuel in the carburetor, as well as the induction system and the cylinder. There also is inadequate control of the sizes of the fuel particles.

As to the throttling action conventionally employed in this type of engines, it is a fact that conventionally the displacement, maximum volumetric efficiency, rpm range, etc. of the engine, are determined by the peak power and torque required from the engine and that these peak values are obtained with the throttle open. Under all other operating conditions, the throttle is partially closed so that the engine must do a certain amount of 'negative' work against the throttle on the intake stroke. The problem is particularly severe in the United States where engines of very large displacement and high peak power are common. Under normal operating conditions, the throttle must be nearly closed most of the time and more energy is wasted in the engine than is required to do useful work.

As to compression ratios, it is known that the efficiency or, in other words, the energy output per mass of fuel of these engines increases with increasing compression ratios. However, the maximum possible efficiency of an engine is seriously limited by the fact that at a compression ratio of about 12 to 1, the temperature of the air-fuel mixture can reach levels at which spontaneous combustion occurs. In other words, detonation occurs and such detonation can produce serious damage. The problem is that at high compression ratios, the air and fuel mixture is very hot, due to adiabatic compression occurring prior to ignition, and, of course, the burning of fuel increases both the temperature and the pressure to even higher levels. Chemical changes then occur in the unburnt part of the charge and these changes tend to make the last part of the charge prone to explode. Numerous efforts have been directed at obtaining maximum compression ratios without detonation. Such efforts usually involve making the bore of the engine smaller or using higher octane gasolines as well as additives such as tetraethyl lead to suppress the detonation. Water also has been used as a suppressor, although its use in the common or popular engines is not practiced.

The design of the combustion chamber and intake port also has received considerable attention, mostly directed at providing a correct amount of turbulence or swirl. Generally, ignition should occur near the center of the charge and burning should proceed in a fairly symmetric manner through the charge. With such symmetry, the time available for the chemical changes is reduced and the last bit if fuel and air to be burnt is at a distance from the spark gap and in the coolest part of the combustion chamber.

However, the common engine leaves a great detail to be desired with regard to controlling the burning process to a degree capable of eliminating detonation in high compression engines.

It is recognized that the design of internal combustion engines involves a very large number of factors, not the least of which involves cost and operating efficiency considerations. In fact, most any engine in popular use represents a compromise between power, weight, size, efficiency, and cleanliness. However, it is believed that existing compromises can be significantly improved and many of the details which will be described are directed at such improvements.

The invention is concerned with a number of features and objects which will be considered in detail in the ensuing description. Some of the more important objects include:

the provision of an improved combustion chamber to achieve better air-fuel mixing and to minimize the problem of undesirable detonation;

the use of finely-divided droplets in the incoming air stream to act as a detonation suppressor and also to cool engine parts;

the provision of an improved air supply for the engine to avoid the disadvantages inherent in conventional throttling;

the provision of an improved fuel injection system to meter increments of finely-divided fuel particles into the combustion chamber;

the provision of an improved control system for varying the metered amounts of both fuel and water, and improvements of the safety and performance of the high pressure fuel injection systems normally used in engines of this type.

BRIEF DESCRIPTION OF THE DRAWINGS

The invention is illustrated in the accompanying drawings of which

FIG. 2 is a "Sequence of Events" occurring in an operating cycle of the present engine;

FIG. 3 is a top view of the engine's reciprocating piston;

FIGS. 4 and 5 are views illustrating the mixing of the engine air and fuel;

FIG. 6 is a sectional view of special fuel injection system;

FIG. 7 is a sectional view of a control mechanism for the fuel injection system;

FIG. 8 is a sectional view of a water pump for supplying water droplets to the engine;

FIG. 9 is a section of a control mechanism for the FIG. 8 water pump;

FIG. 12 is a somewhat diagrammatic sectional view of the vane blower shown in FIGS. 10 and 11.

DETAILED DESCRIPTION OF THE INVENTION

Figure 1:
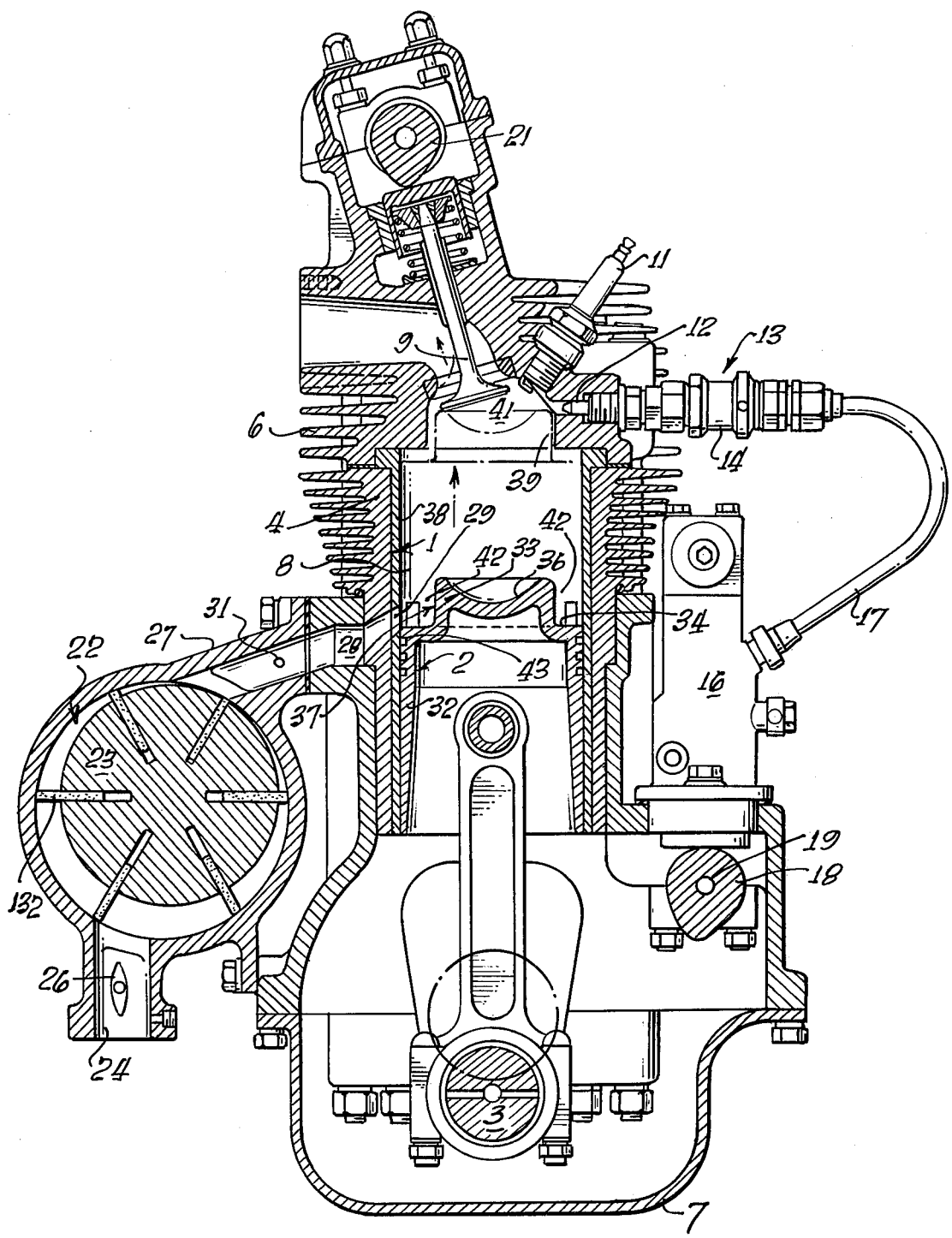
FIG. 1 is a sectional view illustrating the combustion chamber and other significant components utilized in the combustion cycle.

FIG. 1 shows a single cylinder or combustion chamber although, of course, a full motor would include other cylinders in whatever desired number or arrangement may suit the particular purposes to be accomplished.

As shown, the engine includes such conventional components as a cylinder 1, a reciprocating piston 2 linked to a crank shaft 3 contained in a cylinder block 4, a cylinder head 6, and a crank case 7. Cylinder 1 is provided with the usual bore 8 in which the piston 2 reciprocates. At the upper end of bore 8, apertures are provided for an exhaust valve 9, a spark ignition means 11, such as the usual spark plug, and a fuel injector nozzle 12 supplying finely-divided fuel particles under pressure created by a special fuel injector system identified as 13. For the purposes to be described, it may here be noted that injector system 13 includes two separate components, these being a high pressure injector unit 14 and a fuel injector hydraulic pump 16 coupled to the injector unit by a conduit 17. Pump 16 is driven by a cam 18 mounted on a shaft 19 which, preferably, derives its power from crank shaft 3 through a suitable gear or chain coupling. Exhaust valve 9, as will be noted, also is cam-operated by means of a cam 21 which, of course, is synchronized with the compression and power strokes of piston 2.

The supply of air needed for combustion is provided by a special eccentric vane blower mechanism 22, which includes a rotatable vane holder 23 deriving its power by a suitable coupling to crank shaft 3. The blower has an inlet port 24 with a regulating valve 26, and an outlet conduit 27 leading into a space 28 that provides an air reservoir for all of the cylinders. Air is admitted into cylinder bore 8 through inlet opening 29. The cylinder can have a number of such inlet ports spaced to provide a desired air flow. It further will be noted in FIG. 1 that air outlet conduit 27 is provided with a small opening 31, through which finely-divided water droplets are supplied to be mixed with the air before delivery to the cylinder bore. The present engine uses the water as a detonation suppressor in lie of tetraethyl lead or other suppressor means.

Before describing the various components in detail, it may be well to consider more precisely what is implied in the present term 'Positive Power Control Engine', thus, one of the positive control factors is that the operator control over the engine output is achieved primarily by adjusting the eccentricity of vane blower 22 so as to vary the amount and pressure of the air admitted into the bore of cylinder 1. When greater power or torque is required, the eccentricity is increased to increase the outlet air pressure. Also, as will be described, the increase in the air pressure controls both the fuel and the water supplied to the engine so that the net affect of increasing the eccentricity of the blower is to increase the amounts of air, fuel and water supplied to the cylinder and the end result is an increase in torque and power. Also, as will be described, a mechanical link is provided between the operator and the fuel control system to allow small manual adjustments in the amounts of the fuel injected into the cylinder. Additionally, the amount of water supplied to orifices 31 is variable with engine temperatures. It is especially to be noted that the engine does not employ the conventional throttling devices which are considered inefficient. Instead, the blower supplies air to the cylinders according to the demand for torque and power. In other words, the blower positively supplies the correct number of air needed for the output demand so that, again, the engine can be considered as a positive power unit. In conventional throttling systems the engine pistons work against a partial vacuum and does the so-called negative work. In addition to the positive air supply, the engine accurately meters the amounts of fuel and water needed for potimum performance, and the metering again is dependent upon the power demands which, in turn, affect the engine temperature and pressure.

A typical operating cycle of the engine is shown in FIG. 2, which can readily be understood by reference to the physical components shown in FIG. 1. Typically, the cycle can be considered as beginning when piston 2 is at the bottom of its stroke, this position generally being referred to as bottom dead center (BDC). From this position, the piston moves upwardly in a compression stroke to top dead center (TDC) with ignition occuring just prior to TDC to produce the return or power stroke. The engine consequently is a two-stroke engine, as opposed to the conventional four-strokes, although it readily will be apparent tha a number of the features to be described are adaptable for use in other types of engines.

One significant feature which materially improves engine performance is the special shaping of piston 2, as well as cylinder 1, and the effects which this shaping has on compression mixing and burning. As will be noted, piston 2 is formed with a full-diameter cylindrical portion 32 extending from its lower end upwardly through the major portion of its length and with reduced diameter cylindrical upper portion 33. A radial flange portion 34 separates the upper and lower portions and upper portion 33 further is provided with a concave upper surface 36. It also is to be noted that the edges of concave surface 36 are formed with a flat 37 having a functional significance to be described.

Similarly, cylinder 1 has a cylindrical, full-diameter lower portion 38, and a cylindrical upper portion 39, the upper end wall of which is also shaped concavely so that at TDC the concave surfaces of the piston and the cylinder provide an oblate spheroid combustion chamber identified by numeral 41 (FIGS. 4 and 5). A further functionally significant feature is the fact that there is an annular space between the reduced upper portion of the piston and the full diameter portion of the cylinder and, this space, for purposes of identification, is called an annular volume 42. This annular volume is produced between the piston and the cylinder as the piston reciprocates and, along with combustion chamber 41, materially improves the mixing and burning action within the cylinder.

At BDC intake port 29 (FIG. 1) has a bottom edge which lies just slightly below (2mm) the top edge of portion 32 of the piston. Also, intake port 29 is inclined upwardly to direct the air supply in an upward direction against the peripheral surfaces of the reduced diameter portion of the piston. Also, the top edge of the top piston ring 43 is about (2mm) below the bottom edges of the intake ports.

In the FIG. 1 disposition, it can be considered that exhaust valve 9 is closing and i.e., only about half open. Air and small drops of water are flowing through the intake ports and, because of the upward slope, the mixture enters at an upward deflection of about 40°. This stream of air and water flows across the top edge of the piston to strike the reduced diameter portion and then flow upwardly through this cylinder to exit through the exhaust valve. The piston, cylinder, combustion chamber, spark plug, injection nozzle and exhaust valve all are cooled by this flow. Further, combustion products are purged by the flow. As the exhaust valve closes, the cooling flow decreases and finally stops when the valve is completely closed at about 20° after BDC, FIG. 2. Pressure then increases in the cylinder as pressurized air from the blower continues to enter and at about 40° after BDC, the upper edge of the piston passes the upper edge of the intake port to shut off the supply of air and water. The rising piston then compresses the air in the cylinder and, since compression is nearly adiabatic, the temperature and pressure of the air rises rapidly. At about 135° after BDC, the top of reduced diamter portion 33 enters diameter portion 39 of the cylinder to begin to form combustion chamber 41. At TDC the volume in the combustion chamber 41 per unit of cross sectional area in the reduced diameter portion 39 of the cylinder is about twice as great as the volume of the annular volume 42 per unit of area of the radial flange 34. Therefore the compression ratio in the annular volume 42 is about twice as large as that in the combustion chamber 41, and as the piston rises the pressure in the annular volume increases much more rapidly than that in the combustion chamber. This fact, in turn, produces a differential in pressure between the annular volume and the combustion chamber. Air and water from the annular volume, therefore, are forced into the combustion chamber with most of the flow occurring through the relatively large opening provided by flats 37 on the side of the piston. This rush of air into the combustion chamber produces a swirl of both the air and the water mixture within the chamber. Air and water also continue to flow up between the rest of the reduced diameter portions of the piston and the cylinder to produce minor turbulences as may be noted particularly in FIGS. 4 and 5.

Fuel injection normally starts about 40° before TDC, although the exact angle will depend upon the amount of the fuel to be injected. For high power and torque, which requires more fuel, injection starts earlier and the converse is true for lower power demands. Injection ends at about 15° before TDC and importantly, all of the fuel injected into combustion chamber volume 41 is mixed with the air by the flow from annular volume 42. This flow produces both a major swirl and minor turbulences with the result that the air motion achieves a very well mixed mass of air, water and fuel. The fuel and water are in the form of very small drops due to their injections at high pressures through small diameter orifices.

At about 5°-10° before TDC (exact angle depending on rpm) combustion is initiated by spark 11 and a flame front starts to move out from the spark plug. The air-fuel mixture at the instant of ignition is adjusted to be slightly on the rich side, or about 13-14 parts by mass of air to one part fule. During the initial phase of the combustion, the pressure in the annular volume is higher than the pressure in the combustion chamber and the air continues to flow into the combustion chamber or, in other words, into combustion chamber volume 41. This flow maintains this swirl that promotes good combustion and gradually leans out the mixture to insure complete burning of all of the fuel.

During this period the pressure is increasing rapidly in combustion chamber volume 41, due to the burning of the fuel. At TDC the pressure in the annular volume reaches a maximum and then starts to decrease. Within a few degress of TDC, the pressures in the combustion chamber and annular volume are equal. However, flow from the annular volume will continue briefly due to the momentum of the flowing air and water. Within a few degrees after TDC, the flow reverses and about 10°-15° after TDC the pressure will reach a maximum and then start to decrease due to the increase in volume produced by the descending piston.

During the rise to peak pressure in combustion chamber volume 41, the annular volume provides an escape route for end gases which, if left in the combustion chamber volume, could produce detonation. Later, the air in the annular volume provides a reserve to insure complete burning of all the fuel. The high pressure combustion products force the piston down between TDC and 120° after TDC when the exhaust valve starts to open. The pressure then drops rapidly as the combustion products escape through the open valve. The pressure also is being reduced by the increasing volume as the piston descends. At about 40° before BDC, the upper edge of the piston passes the upper edges of intake ports 29 and pressurized air containing small water droplets begin to enter the cylinder. At about 15° before BDC, the exhaust valve reaches its maximum lift and begins to descend to the midway point which, as stated, arbitrarily is considered as the starting point of the cycle that has been described. As should be apparent, the principle advantages reside in the shaping of both the piston and the cylinder, which due to the formation of the annular volume and the spheroidal combustion chamber volume, produce an excellent mixing action to assure complete burning and, in addition, to achieve a burning control in which substantially complete combustion is achieved within the spheroid volume with a portion of the gases being permitted to escape to the cooler annular volume where they can be burnt without undesirable detonation.

Fuel injection system 13 is illustrated in FIGS. 6 and 7. Generally, it consists of the previously identified fuel injector unit 14, a hydraulic pump 16 and a conduit 17 coupling these components. In addition, the system includes a fuel control system shown in FIG. 7.

Pump 14 includes a cup-type cam follower 44 driven by cam 18 which, as indicated, is mounted on a drive shaft 19 coupled to the crank shaft. Cam 18 produces a maximum lift of follower 44 at about 15 degrees before TDC. Lift occurs during about 60 degrees of rotation. The force of the cam is transmitted by a stem 46 to a hydraulic piston 47 and as the piston moves through cylinder 48, the pressure increases to force hydraulic fluid to flow out of the cylinder. Initially a small amount of fluid is replenished through orifice 49 from a reservoir which is not shown but which normally would be located a few centimeters about the highest point i the hydraulic system. After replenishment, orifice 49 is covered by the piston and the hydraulic fluid either must flow into a control cylinder 51, or out of the pump through conduit 17. The entrance to control cylinder 51 is blocked by a control piston 52, held against its beveled shoulder by a spring 53, a stop 54 and a control cam 55. Control cam 55 rotates about an axis through the center of a hexagonal control shaft 56 so that, in effect, rotation of shaft 56 moves cam 55 to, in turn, move stop 54 upwardly or downwardly.

As will be noted, the hydraulic fluid leaving through conduit 17 is applied to an injector unit as the driving force for several reciprocable components. The mass of these components is greater than the mass of the piston 52 in the hydraulic pump. Also, the preloading and spring constant of spring 53 are less than those of the spring in the injector unit for the purpose of assuring that piston 52 will be moved upwardly in its control cylinder until it is stopped by the presence of stop 54. The purpose of this arrangement is to assure that hydraulic flow to the injector unit does not occur until piston 52 is so stopped. Consequently, fuel injection from unit 16 does not occur until the hydraulic piston is stopped at the point determined primarily by the position of control arm 55, and its control shaft 56. Rotating shaft 56 in a clockwise direction pushes stop 54 further into its cylinder to reduce the travel of piston 52 and, in turn, reduce the amount of hydraulic fluid that can flow into cylinder 51. The reduction of flow into cylinder 51 increases the flow into the adjacent and this increase, in turn, causes more fuel to be injected into the engine. Obviously there will be some leakage past the customary seals and this leakage fluid is returned by system 57 for reuse.

With regard to injection unit 16, the hydraulic fluid forced through conduit 17 flows into an inlet tube to act on a power piston 58. Piston 58, in turn, acts on injector piston 59 to force fuel contained in cylinder 61 out through previously-identified injector nozzle 12 and into the combustion chamber volume of the engine. Fuel is supplied to cylinder 61 initially through an intake conduit 62 coupled to a low pressure pump of about 4-5 psi. In practice, the fuel supply conduit so connected to this unit also is connected to other injector units and to the fuel pump. the fuel first flows around an annular passage and then enters the cylinder through several holes or orifices 63 which are opposite a groove 64 that is made long enough to allow fuel to flow during the entire stroke of piston 59. The fuel then flows through openings 66 which connect groove 64 with the entrance to a check valve 67. The spring of this valve is very soft having a low spring constant and a low preload so as to allow fuel to flow when the pressure at its extrance is more than a few is higher than its exit. The check valve is shut off effectively during injection in spite of the soft spring since as piston 59 moves upwardly, the inertia of the ball of the check valve causes it to block the entrance of the valve. Also back pressure from the fuel in cylinder 61 holds the ball firmly in place until the return stroke begins. During the return part of stroke, an upper check valve 68 is closed so as to cause a low pressure in cylinder 61. Check valve 67 then can open to allow fuel to flow upwardly into cylinder 61. This flow can occur during the return stroke and during the long interval between strokes to provide a complete filling of the cylinder by a low pressure fuel supply.

During the injection portion of the stroke, or in other words, during its upward movement, lower check valve 67 is closed and piston 61 forces the fuel through check valve 68 and outwardly through nozzle 12. The spring in the upper check valve 68 is much harder than that in the lower check valve. The pressure in cylinder 61 must reach over 100 psi before the upper check valve 61 opens to permit fuel injection. Even at this pressure very little fuel will be injected due to the small diameter orifice of the nozzle and due to the back pressure it produces behind the check valve 68. Most of the fuel will be injected at pressure of 1000 to 2000 psi to produce a spray of very fine particles of fuel. At these pressures there will be some slippage or leakage of fuel into space 69 and there also will be some leakage from the low pressure fuel supply. A fuel return conduit 71 provides a drain for this leakage. Fuel that leaks into this space is returned by the conduit to the low pressure side of the fuel pump that supplies the injector through intake conduit 62. The piston is spring-returned to its lower position and for obvious reasons the spring constant and its preload should be matched to the mass of the moving components and to the viscous damping forces in such a manner that it prevents any oscillation or floating even at the highest possible angular velocities of the engine. The reason for using the two pistons 58 and 59 are, first, to provide an extremely close fit between small diameter piston 59 and high pressure cylinder 61. Also, alignment must be nearly perfect to reduce wear and binding. Further, using the two piston arrangement, the power piston 58 can be designed to provide the best possible separation of the hydraulic fluid and the fuel both of which are present in its cylinder.

FIG. 7 illustrates a fuel injection control system which is designed to control several hydraulic pumps such as pumps 14 and one or two water injection pumps of a type that will be described. The need to inject accurately metered amounts of fuel into the combustion chamber so as to provide precisely the correct ratio of fuel to air is a most important factor in the proper operation of internal combustion engines and it is particularly critical in spark-ignition engines. These engines operate efficiently only over a rather narrow range of mixture ratios. In many types of engines the ratio is controlled by varying amount of air that is supplied to the engine and, although this can be done, the achievement of optimum mixtures at all times is quite difficult. The present system instead controls the amount of fluid although the control, as will be seen, is made proportional to the air pressure provided by eccentric vane blower 22 and inversely proportional to the temperature of the air in the cylinder. In this regard, it will be noted that the correct mass of fuel for each injection depends on such factors as the cylinder volume, the desired mixture ratio and, as indicated, the temperature and pressure of the air in the cylinder. Since the cylinder volume is fixed by engine design and the desired mixture ratio is based usually on a compromise between economy, torque, power and 'smooth' operation, the significant variables in the operating cycles are the pressure and temperature of the air. Unfortunately, precise measurements of these pressures and temperatures are extremely difficult if not impossible.

In the present positive power control engine the fuel control system is based on the assumption that the temperature and pressure in the space that is connected to and physically close to the intake ports will provide an adequate indication of the conditions in the cylinder during induction. The pressure in this space and in the fuel control system will be slightly higher than in the cylinder because, while the intake port is only open part of the time, the spaces in the control system are connected to the blower output of all times. Also, during much of the time the exhaust valve is open and relieves the pressure of the cylinder. However, the exhaust valve does close before the intake port opens and this allows the pressure in the cylinder to approach the pressure in the intake duct which is connected to the blower and control system. The temperature of the air in the control system will be very nearly equal to that of the air in the cylinder. The first air that enters the cylinder will be heated by the hot piston, cylinder walls, combustion chamber, etc.; but this air will blow through the open exhaust valve. The air that enters later, particularly after the exhaust valve closes, will be heated only slightly. It is this last charge of air that is involved with combustion and is therefore important in the fuel control problem.

With reference to FIG. 7, the present control system is located on the right side of cylinder block 4, between two cylinders of the motor. Air and water particles enter a space 28 directly from eccentric vane blower 22 which is out of view to the left. Two intake ports 29 are shown in the drawing and it will be understood that space 28 connects the intake ports in the engine with the blower and control system. An opening 73 in the side of the block allows air to flow into the chamber 74 from which the air can flow through openings 76 into a bellows chamber 77. Part of the air can exit through a small opening 80 which provides a drain for condensed moisture and also permits a small air flow through the chamber. A bellows 78 provides the temperature and pressure responsive element which ultimately determines the metering of the injected fuel. This bellows contains a sealed volume of air and, obviously, the variable length of the bellows depends on the temperature and pressure of its environment. The bellows acts on a plunger 79 which is under a compressive load from a first lever 81 that rotates about a pivot 82 attached to a mounting bracket. At its top lever 81 is coupled by a pin 83 to a horizontal link 84 which in turn, is coupled by a pin 85 to a control lever 86. A significant fact to be noted is that control lever 86 rotates about the axis of previously-identified shaft 56 shown in FIG. 6 as the hexagonal shaft for driving cam 55 and setting stop 54 of the pump. Thus, movements of control lever 86 also produce rotation of the hydraulic pump control cam 55 which determines the amount of fuel and water that is injected into the engine. A spring 87 is a tension spring providing the force required to rotate control lever 86 in a clock-wise direction (for increased fuel injection) and also it provides a compression force via control lever 86, horizontal link 84 and first lever 81 for plunger 79 of the bellows. This spring is attached to an adjustment lever 88 at one end and the lever rotates about a pivot 89 carried by the mounting bracket. A second spring 91 connects the bottom of the adjustment lever 88 to a pin 92 also carried by the mounting bracket and this second spring provides a moment to balance the moment of top spring 87. At its upper end, adjustment lever 88 is attached to an adjustment control wire 94 and this wire runs through a flexible tube 96 to an engine control area. Movements of wire 94 change the tension spring 87 and produce a rotation of control lever 86. This mechanism provides a manual control of the amount of fuel supplied to the engine.

Operationally, bellows 78 acts as a transducer for temperature and pressure effects. When the air around the bellows is heated, heat is transferred to the air inside the bellows and the pressure and/or volume of the bellows must increase. Bellows are elastic over a limited range of motion and behave like a spring within this range. Therefore, an increase in pressure inside the bellows increases the bellows length and, through the mechanical linkage which has been described, shaft 56 is rotated to set stop 54 of the hydraulic pump which setting determines the amount of fuel injected into the engine. Obviously, cooling has the opposite effect. Differences in the pressure between the inside and outside of the bellows also produces length changes. When the outside pressure is greater the bellows will compress until the pressure and spring forces are in equalibrium.

In its preferred form, the spring constant of the bellows is sufficiently high to limit the motion of the bellows to less than about 20% of its length even under the most extreme operating conditions. Under most operating conditions the bellows' length will only change about 5-10% from its free length. Therefore the change in the volume will be relatively small. Also, as can be calculated, the change in the length of the bellows is approximately a linear function of the temperature and pressure in its surrounding space. However, the correct amount of fuel to be injected into the engine is not truly a linear function of temperature and pressure. The nonlinearity, nevertheless, is not serious from a practical point of view provided the fuel control and injection system both are properly designed and are compatible. Thus, the mass of fuel to be injected may be thought of as an average mass plus or minus a 'small mass'. The small mass of fuel then will be approximately a linear function of pressure and temperature just as is the displacement of the bellows. The average mass is based on average temperatures and pressures in the cylinder and these average values depend primarily on the most frequently used power levels and hence the blower pressures and ambient air temperatures and pressures. The small mass of fuel is the amount required to correct for variations in the power levels and changes in the ambient conditions of temperature and pressure. Based upon this premise, if the ratio of initial pressure to initial temperature in the bellows is equal to the ratio of average pressure to average temperature in the cylinder just prior to the compression stroke, then the displacement of the bellows is proportional to the amount of fuel that is required to correct the variations and in demand around an average mass of fuel.

It is believed that the fuel injection and control system illustrated in FIGS. 6 and 7 is a distinct improvement over carburetors used in most conventional engines. Injection at very high pressure through a small diameter nozzle produces extremely fine particles of fuel that are easily mixed and burned. The fuel is accurately metered to each cylinder and the amount of fuel to be injected is corrected for both the temperature and pressure of the air that is supplied to the cylinder. The fuel control system also is connected to the water injection pumps in a manner that will be described to insure the correct ratio of fuel to air and water. It is known that the other fuel injection systems in common use, such as the Bosch System, uitlize bellows or diaphragms to provide control. However, the Bosch System, for example, uses two bellows in its control system with one bellows correcting for variations in ambient air temperature and pressure and the other connected to a venturi in the air intake ducting. Also, the sensors in the Bosch System are relatively remote from the cylinders and provide a rather indirect indication of the mass of air entering the cylinders. Even so, the system is very well engineered and works well. The present system, however, couples the air entering each cylinder through a number of ports into bellows chamber 77 and, when the cylinder intake ports are open, the cylinder and chamber 77 are intimately connected. Although a single bellows is used, it provides a very direct indication of temperature and pressure. However, the air that actually is entering the cylinders and the mass of air in the cylinders is determined by the temperature and pressure of the air.

Further, the present injection system is safer than most existing systems since highly flammable fuel or gasoline is under high pressures only when it is in injection cylinder 61 of injection unit 16. Leakage from the cylinder is positively connected and returned to the low pressure fuel return system. There is little or no possibility of gasoline under high pressure being sprayed out through holes in ruptured tubing or poorly assembled fittings. The separate hydraulic pump and injector coupled together by a length of tubing 17 perhaps are a little more complicated than some other injection systems but they do provide a very important safety feature.

The metering system in the hydraulic pump also has advantages over other systems in that it permits the termination of fuel injection to occur at the same point in the operating cycle for various amounts of fuel. Thus, fuel injection ceases very shortly after cam 18, which drives the hydraulic pump, reaches its maximum lift. Also, fuel injection commences after control piston 52 of the hydraulic pump hits stop 54. The range of times determining when injection starts can be adjusted by designing the hydraulic cylinder with various displacements relative to that of the power piston in the injector. This design provides a method for adjusting the range of duration of injection and allows a cam with a gentle lift to drive an injection system that can produce very short injection times. For example, if the displacement of the hydraulic cylinder is made large compared with that of the power cylinder, control piston 54 can be allowed to travel a considerable distance before it hits its stop. This travel can occupy any desired part of the time that the cam is lifting and only when the control piston hits the stop will the hydraulic fluid be diverted to the injector and initiate fuel injection. A 120° cam that lifts during 60° can power an injection system that injects fuel during only a few degees of crank shaft rotation.

As has been noted the positive power engine also utilizes a water supply admitted into eccentric vane blower outlet duct 27 through orifices 31. As will be explained, the water is supplied by a water injection pump which is partially controlled by the fuel control system and this control makes it possible to increase or decrease both the fuel and water at the same time as well as maintain them in a given ratio for engine temperatures.

The hydraulic pump for supplying the water is shown in FIG. 8 and the temperature control system for the supply in FIG. 9. Referring to FIG. 8, it generally can be noted that the pump is very similar in a number of respects to the hydraulic fuel injection pump shown in FIG. 6. Also, the pump incorporates some of the features of the fuel injector unit which in the fuel injection system is a separate unit for reasons of safety In the case of the water pump there is no fire hazard and most of the pump components can be contained in one housing.

In practice, the water pump of FIG. 8 is located on an extension of the lower right side of the cylinder block and, as shown, it receives its power from a two-lobed cam 97 that is mounted on cam shaft 19 which will be recognized as the cam shaft that drives the hydraulic pump of the fuel injection system. A cup-type cam follower 98 transmits its force to a piston 99 and water from a low pressure pump enters through an opening 101. It then passes through an annular groove 102 until it reaches openings 103 of a lower check valve 104. During the return stroke and the period between strokes, water flows through the lower check valve and up through passageway 106 into a cylinder 107. This cylinder has features similar to both hydraulic cylinder 48 of the fuel injector pump and fuel injector unit cylinder 61. When the cam lifts piston 99, lower check valve 104 closes and the piston exerts a force on the water in the cylinder which can be relieved in two ways. First, a control piston 108 can move upwardly against a force produced by a spring 109 until it hits a stop 111. Alternatively, water can exit via passageways 115 through an annular groove 115a and a check valve 114 to a fitting 116 that connects the pump with tubes that lead to the water injection nozzles in the air intake system.

Lower check valve 104 opens under pressures of only a few psi, while upper check valves 114 opens only when the pressure in cylinder 107 is about 100 psi greater than it is on a nozzle side of the valve. The amount of water that is injected is controlled by the location of stop 111, which, in turn, is controlled by the orientaion of a "fuel" cam 112 that is adjusted by the hexagonal control shaft 56 which as has been noted, controls the position of stop 54 in the hydraulic pump of the fuel injection system (FIG. 6). The "fuel" cam and control cam 55 of the fuel injection hydraulic pump are arranged to change the amount of both fuel and water in the same direction. Temperature cam 113 is connected to the temperature control which will be described very shortly. This temperature cam causes the amount of water that is injected to increase when the engine temperature increases. A suitable drainage system also is provided for this pump.

FIG. 9 shows a temperature control system for the water supply pump of FIG. 8. As indicated in FIG. 9, the control is attached to one side of the top of the FIG. 8 pump and its primary purpose is to adjust the amount of water that is injected for variations in the engine temperature. When the engine is cold, less water is injected and, as its temperature increases, the water supply is increased. The main sensor for the control is a bulb 117 that is filled with a thermal liquid (a liquid that has a high thermal coefficient of expansion). The liquid acts on a bellows 118 that is mechanically linked to the temperature cam 113 which partially controls the amount of water that is injected. Bulb 117 as shown, is attached to the outside of cylinder head 6 and is kept in close thermal contact with the cylinder head by a suitable clamp 120. The cross sectional area of the bulb is made small to allow rapid heat exchange between the cylinder head and the thermal. An adequate volume of thermal fluid is obtained by making the long dimension of the bulb extend the entire length of the cylinder head.

When the temperature of the cylinder head changes, the volume of the thermal fluid in the bulb will also change and the fluid will move into the sealed volume of chamber 119 surrounding bellows 118. An increase in temperature compresses the bellows and a decrease causes it to expand. A rod 121 is soldered or welded to the inside of the bellows near its top end and at its bottom end, there is an adjustable bearing 112 which, in turn, is coupled to a pivot 123 which extends from a lever 124 that is attached to previously-identified temperature cam 113. Actually, lever 124 and cam 113 can be machined from one piece of metal. Hexagonal control shaft 56 passed through the inside of temperature cam 113 and a bearing 126 is supported by the housing of the temperature control. Bearing 126 and another bearing on the other side of the pump support loads imposed on the cam. One result of the arrangement is that fuel cam 112 is coordinated with control cam 55 of the fuel injection system (FIG. 6) so that both cams change the amount of fuel and water in the same direction. In addition, the temperature cam is directly responsive to engine temperature to vary the amount of water supplied to the engine. In general, the control makes it possible to increase or decrease both fuel and water at the same time and to maintain them in the proper ratio for a given engine temperature.

Figure 11:
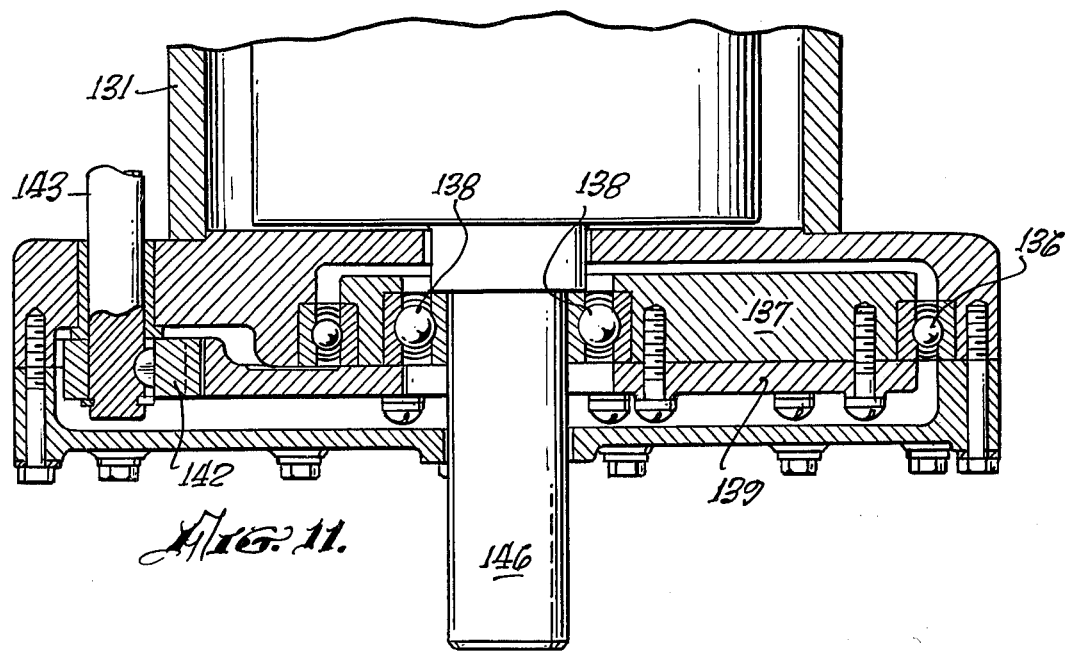
FIGS. 10 and 11, respectively, are end and sectional views of an eccentric vane blower used to supply the engine air.
Figure 10:
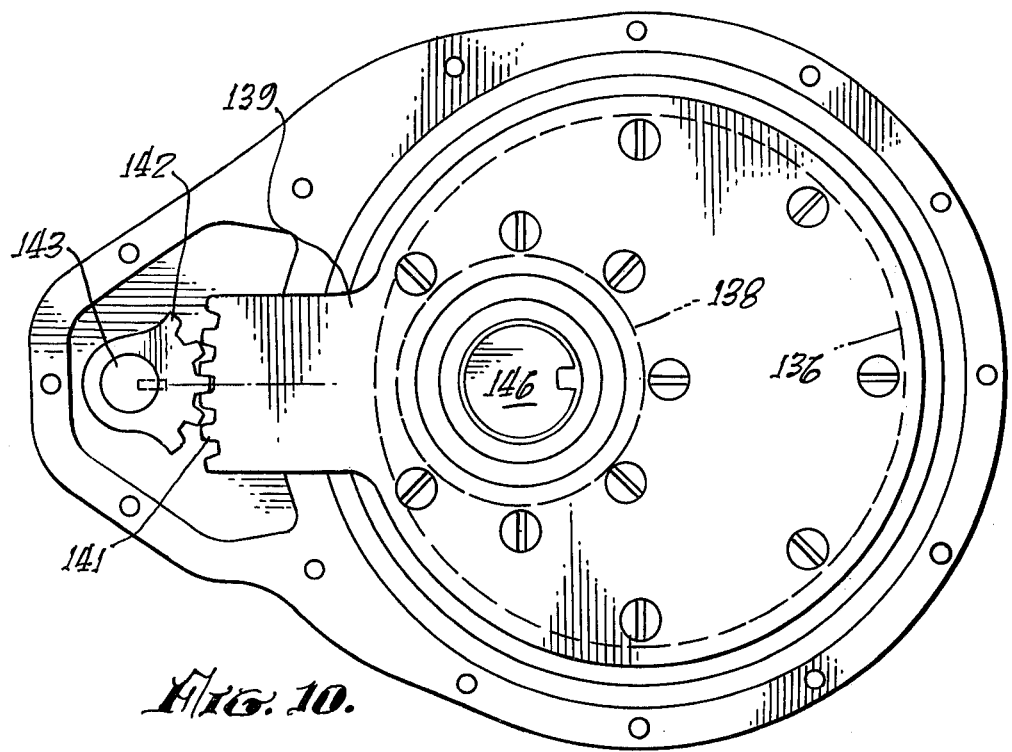

FIGS. 10 and 11 are provided to illustrate the mechanism for adjusting the eccentricity of eccentric vane blower 22. FIG. 10 is an end view of the mechanism with an end cover plate removed to better illustrate the underlying parts while FIG. 11 is a sectional view through one of the ends of the blower mechanism. Each end of the blower will be provided with the mechanism of the type shown and they will be very similar although not identical. Thus, the drive shaft for vane holder 23 (FIG. 1) will extend only through one end in most cases. Also as viewed from the end, their layouts will be mirror images of each other. Before considering the details of the mechanism the general operation can be appreciated by referring to the schematic of FIG. 12. As there shown, eccentric vane blower includes a blower housing 131 with its inlet 24 and its outlet conduit 27. Vane holder 23 is mounted within housing 131 and, as shown in FIG. 1, the holder carries a number of circumferencially-spaced vanes 132. The objective of the entire mechanism is to move the rotatable axis 133 of the vane holder relative to axis 134 of the blower housing. This motion of axis 133 changes the eccentricity of the blower. Most of the details of the mechanism are intended to provide this relative motion while maintaining proper alignment of bearings at both ends with a minimum amount of vibration, wear, etc. Another important design criterion is to allow precise control of eccentricity with a minimum of force or effort.

Varying the eccentricity of the vane holder in this manner increases or decreases the amount and pressure of the air supplied to the cylinders in accordance with demand for torque and power as determined by the operator. At lower power levels corresponding to a partially closed throttle in a conventional engine, very little power is required to operate the blower and the axis of the vane holder is near the axis of the blower housing.

In varying the eccentricity, axis 133 of the vane holder, as shown in FIG. 12, rotates about an axis 135 which, as shown in FIG. 11, is determined by the center of large diameter bearings 136 at each end of the blower. The outer races of bearings 136 are fixed relative to the blower housing 131, while the inner races support shaft bearing holders 137 which, in turn, support shaft bearings 138. The outer races of bearings 138 and the inner races of large diameter bearings 136 are clamped to holders 137 by a gear plate 139 held in place by screws that are threaded into bearing holders 137. The gear plates have a small arc of gear 141 (FIG. 10) meashed with sector gears to the accelerator control linkage by means of which the operator controls the eccentricity. This linkage, of course, may be provided by any of the usual combinations of levers, gears, wires and pulleys. Both shaft bearing holders 137 rotate about a common axis which is the previously mentioned axis 135 (FIG. 12) or the axis through the centers of the large diameter bearings 136. Also orientation at both ends is the same since both ends are connected by shaft 143 and the meshed gears that have been described. Therefore, axis 133 of vane holder can be made to rotate in a controlled manner about axis 135. Axis 133 moves along arc 144 (FIG. 12) between axis 134 of the blower housing and extreme axis 133-A of the vane holder.

When axis 133 of the vane holder coincides with axis 134 of the housing, the increase in pressure between intake 24 and exhaust 27 is negligible. Some air flow is included by the orientation of the force relative to the direction of the rotation of the air in the blower, but the boosting pressure at the exhaust is very small. As axis 133 is moved toward axis 133-A, the eccentricity increases and this in turn produces an increase in pressure at outlet 27.

The power that drives the blower is derived from the crank shaft and it may be transmitted from the crank shaft to the vane holder by a gear train, chains and sprockets or belts and pulleys. The gear, sprocket or pulley will be mounted on drive shaft 146 (FIG. 11). For ease of control all driving forces must be parallel to a line that passes through the axis 135 and the axis of the shaft 143. If the driving forces are parallel to this line, then the pressure between gears 141 and 142 will be negligible. There also will be small moment due to friction in the shaft bearing and, if the bearings are properly designed and lubricated the moment will be insignificant. Consequently, operator control can be easily accomplished.

As has been indicated, one particular advantage of the eccentric vane blower arrangement is most apparent when this arrangment is considered against a background of the conventional throttle-type engine. In this regard, it is recognized that most any conventional spark ignition engine is designed to produce some required or desired peak output power when the air supply to the cylinders is restricted as little as possible. Under normal operating conditions, these peak power levels are seldom required and the engine must operate at At low levels most of the time. The reduction is output is achieved by restricting the flow of air to the cylinders with a throttle. The throttle acts as a valve or obstruction and produces a partial vacuum in the induction system and cylinder during the intake stroke. The reduction in pressure has two principle affects on engine operation. First, the amount of air that is supplied to the cylinder is reduced and, if the fuel control system is operating properly, so is the amount of fuel. This is the effect that is desired since reducing the air and fuel will reduce the output of the engine. Unfortunately, however, a high price is paid for the reduction in air and fuel. During the intake stroke, the engine must pull the piston down against a partial vacuum. The energy required to work against a partial vacuum is wasted and the efficiency or useful work per unit of fuel is seriously affected. In other words, a throttled engine efficiency depends upon the ratio of average to peak power and a very powerful engine operated as normally is the case at only a fraction of its peak power is very inefficient, since the throttle is nearly closed most of the time. An engine that is operated with its throttle open is quite efficient, but unfortunately most of these applications require a considerable range of power output.

The present eccentric vane blower replaces the throttle and supplies air to the cylinder according to the demand for torque and power. Obviously, the power required to operate the blower will increase with the amount and pressure of the air that is supplied to the cylinders. However, the increased air supply also produces engine power outputs that are several times greater than the power used by the blower and this fact results in a net gain of useful power when it is required. at lower power levels corresponding to a partially closed throttle, very little power is required to operate the blower. The axis of the vane holder is near the axis of the blower housing and the boost pressure is low. At low pressures the forces on the vanes are small and very little energy is required to rotate them. While a throttle is not required to control the output of the engine, it can be used in certain situations. For example, a throttle is beneficial to provide engine braking as it does in conventional engines and to provide a load on the engine when the external load is removed. A valve in the intake of the blower can provide the throttling action, and, if desired, it can be controlled by a servomechanism sensing the requirement for braking such as a high engine rpm when the accelerator pedal is not depressed.

Another distinct advantage of the present engine is its fuel injection system and the system control. The particular advantages have been discussed to some extent and, generally, they involve the use of one bellows and the fact that it directly senses and reacts to the temperature and pressure of the air actually entering the cylinders. Also, the injection system is safer due to the separation into two units of the pump and injector unit which eliminates the need for transporting fuel under high pressure and tubing and, for a variety of reasons, minimizes the danger of fire. Further, the metering system itself is an advantage in view of its very short injection times and close control of these times and periods.

Another feature is the use of water as a suppressant for detonation and the use of the air-water mixture to cool the engine during the intake compression stroke. Also, the close control or metering of the water supply permitted by the particular water pump and its control should improve engine performance and one of the distinct advantages in the metering is that it is closely responsive to engine temperature and also variable directly with the fuel supply in the manner which has been described in detail.

Finally, the engine design itself appears to have a number of advantages over existing designs. In particular, the formation of the annular volume is one that produces excellent mixing as well as a complete burning of the injected fuel. Also, it permits the use of high compression ratios which, of course, increase the efficiency of the engine. High compression ratios can be used because the likelihood of resulting detonation of end gases and the like is drastically reduced. For one thing, the small diameter combustion chamber, as well as the intimately mixed fuel and air tend to reduce the time required to burn the fuel and this fact, in turn, reduces the time available for the formation of explosive end gases that cause detonation. Further, during the first stages of the combination, air from the annular volume is forced into the combustion chamber volume so that end gases cannot form. Later, the region will be deficient in fuel due to the recent incoming air flow. Toward the end of the combustion when detonation normally would occur the high pressure in the combustion chamber forces the end gases back into the annular volume where the temperature and pressure are not high enough to produce detonation.

As has been indicated, the use of water is an excellent detonation suppressant. For example, engines using 80 octane gasoline for fuel and only water as a suppressant have been run with compression ratios of 13 to 1. Another consideration is that the small diameter combustion chamber volume and the step in the cylinder reduce the peak forces on the engine and allow a more efficient expansion of the combustion products before they are exhausted. During the period of peak pressure, these high pressure gases act only on the small diameter extensions in the pistons to greatly reduce the forces on the piston, connecting rod, crank shaft and bearings. Later, when the pressure in the cylinder is reduced, the forces act on the entire top portion of the piston.

Although the drawings illustrate a particular prefered form of engine and its associated components, it should be recognized that certain modifications can be made without departing from the principles of the invention. For example, it is not necessary that a reduced diameter portion of the piston and the cylinder be precisely cylindrical as shown in FIG. 1. Instead, the piston could have another reduce diameter portion which is slightly conical, rather than cylindrical and the cylinder would be shaped accordingly. This configuration provides clearance between the piston and cylinder at top dead center. Even so, the piston and cylinder would be shaped so that the spheroidal combustion chamber volume is formed at top dead center. Other changes clearly can be made in the implementation of each of the components and such changes would be well within the anticipated engineering developments of the engine. For example, a planetary gear system can be used to provide added variation in the amount and pressure of the air pumped to the blower. Also, of course, materials for the various components can be selected according to the environment in which they operate. For example, it would be desirable to line the reduced diameter portions of the piston and the cylinder with a stainless steel alloy in view of the extremely hot combustion products flowing between these two members. These gases can cause serious erosion of aluminum surfaces and they will also transfer heat, due to the high thermal conductivity. The bulk of the head, the block and the cylinders, piston and blower should be fabricated from aluminum, but they should be lined with other metals to provide wear. For example, the cylinders could have cost iron liners.

Obviously, many modifications and variations of the present invention are possible in the light of the above teachings. It is therefore to be understood that within the scope of the appended claims the invention may be practiced otherwise than as specifically described.

I claim:

1. An internal combustion engine comprising:
   an elongate combustion cylinder formed with a longitudinal bore closed at its upper end and having a full diameter lower portion extending the major part of its length and a reduced diameter upper portion,
   a driven piston reciprocably mounted in said bore for providing an upward compression stroke from a bottom dead center position to a top dead center position and a return power stroke,
   said piston also having full and reduced diameter portions corresponding dimensionally to said bore portions whereby during said compression stroke an annular volume is formed between said reduced diameter piston portion and said full diameter bore portion,
   said reduced diameter portions of the bore and piston having shaped upper end surfaces facing one another at top dead center for providing a shaped combustion chamber volume having an attenuated communication with said annular volume,
   an air supply means communicating with said full diameter bore portion during the first part of said compression stroke,
   fuel supply means,
   ignition means, and
   exhaust gas venting means,
   said fuel supply ignition and venting means being disposed in operable communication with said shaped combustion chamber volume whereby during said compression stroke the compressed air supplied to said annular volume mixes intimately with the fuel supply in said combustion chamber volume for enabling rapid ignition and substantially complete burning within said latter volume with any final burning occurring during the initial part of said return stroke in said annular volume.

2. The engine of claim 1 wherein said shaped combustion chamber volume is an oblate spheroid.

3. The engine of claim 1 wherein said bore and piston are relatively dimensioned to provide an annular volume having a substantially greater compression ratio than that of the combustion chamber volume whereby the pressure differential during the compression stroke and during initial burning forces said annular volume air into said combustion chamber volume.

4. The engine of claim 3 wherein said full and reduced diameter portions of said bore and piston are cylindrical and the shaped surfaces both are concave whereby compressed air forced into said spheroidal combustion chamber volume during the end of said compression stroke produces a swirling action for intimately mixing said air and fuel supply.

5. The engine of claim 3 further including:
   a water supply means, said means supplying water droplets into said air supply for application as an air-water mixture into said bore during said first part of said compression stroke.

6. The engine of claim 5 wherein said air and water are directed upwardly into said annular volume during said first part of the compression stroke, said air and water supply to the bore then being shut off by said full diameter piston portion.

7. The engine of claim 3 further including:
   means for opening and closing said exhaust gas venting means, said means permitting said venting means to remain at least partially open during the first pair of the air supplying portion of the compression stroke for producing a scavenging and cooling air flow from said bore through said venting means.

8. The engine of claim 3 wherein said air supply means is an operator-controlled eccentric vane blower.

9. The engine of claim 8 wherein said vane blower includes:
   a circular housing having an air outlet conduit communicating with said cylinder bore and an air supply inlet,
   a rotatably-driven vane holder mounted in said housing with its axis of rotation eccentrically-adjustable relative to the center of the circular housing and,
   operator-controlled means for adjustably varying said eccentricity to vary the amount and pressure of the air supplied to said cylinder bore through the outlet conduit of the blower.

10. The engine of claim 9 wherein the power generated by said power stroke of the piston is coupled to said vane holder for producing said rotatable drive.

11. The engine of claim 3 wherein said ignition means is a spark plug means, and
    said fuel supply means is a fuel injection system for controllably injecting metered increments of fuel into said combustion chamber volume, said system including:
    control means responsive to the temperature and pressure of said cylinder bore air supply for varying said increments to insure optimum fuel to air ratios.

12. The engine of claim 11 wherein said air supply means is an operator-controlled eccentric vane blower having an outlet conduit communicating with said cylinder bore, and said fuel injection system includes:
    a chambered housing,
    a temperature and pressure-responsive bellows mounted in said housing chamber,
    conduit means directly coupling said chamber with said blower conduit for establishing the temperature and pressure conditions of the air in said blower conduit as the environment of said bellows, and
    mechanical means coupling the bellows to said fuel supply means whereby temperature and pressure-produced dimensional variations in said bellows varies the fuel supply increment entering said combustion chamber volume.

13. The engine of claim 12 wherein said mechanical coupling includes:
a control shaft rotatably driven by said bellows, and
a cam fixedly mounted on said shaft,
said fuel supply increments being controlled by shaft-produced rotational movements of said cam.

14. The engine of claim 13 further including:
a water supply means, said means supplying finely-divided water droplets into said air supply for application as an air-water mixture into said bore during the first part of its compression stroke, and
control means responsive to said engine temperature for varying the amount of water supplied to said air supply,
said water supply control means including a control cam fixedly mounted on said fuel supply control shaft whereby said water supply is variably responsive both to said fuel supply and said engine temperature.

15. The engine of claim 14 wherein said water supply means includes:
a water pump cylinder,
cam-driven piston means reciprocably mounted in said cylinder for forcing said water into said air-supply vane-blower conduit, and
a stop member carried by said cylinder for arresting said water pump piston reciprocation and thereby stopping the supply of water to said conduit,
the disposition of said stop member relative to said piston reciprocation being controlled by said control cam of said water supply control means whereby the water supply is variably responsive both to said fuel supply and said engine temperature.

16. The engine of claim 3 wherein said fuel supply means is a fuel injection system for controllably injecting metered increments of fuel into said combustion chamber volume, said system including:
a hydraulic pump,
a fuel injector unit driven by said pump, and
an elongate conduit communicating said pump with said injector unit,
said pump including:
a cylinder having a hydraulic fluid chamber,
a cam-driven piston reciprocably mounted in the cylinder for pressuring the fluid in said chamber,
a second piston reciprocably responsive to the pressure of said fluid for means resisting the pressure stroke movement of the piston and
an adjustable stop for arresting said pressure stroke reciprocation,
said chamber having an outlet coupled to said elongate conduit whereby hydraulic fluid under pressure is forced through the conduit into said injector unit when said second piston is arrested, and
said injector unit including:
a fuel-containing cylinder having a fuel injection nozzle at one end and an inlet opening at the other, said inlet opening being coupled to said elongate conduit.

* * * * *